Sept. 25, 1923. 1,468,961
H. J. CARY-CURR
EXTRACTION APPARATUS
Filed Feb. 28, 1923 2 Sheets-Sheet 1

Inventor:
Henry J. Cary-Curr,
By Dynforth, Lee, Chritton & Wiles
Attys.

Sept. 25, 1923.
H. J. CARY-CURR
EXTRACTION APPARATUS
Filed Feb. 28, 1923 2 Sheets-Sheet 2
1,468,961
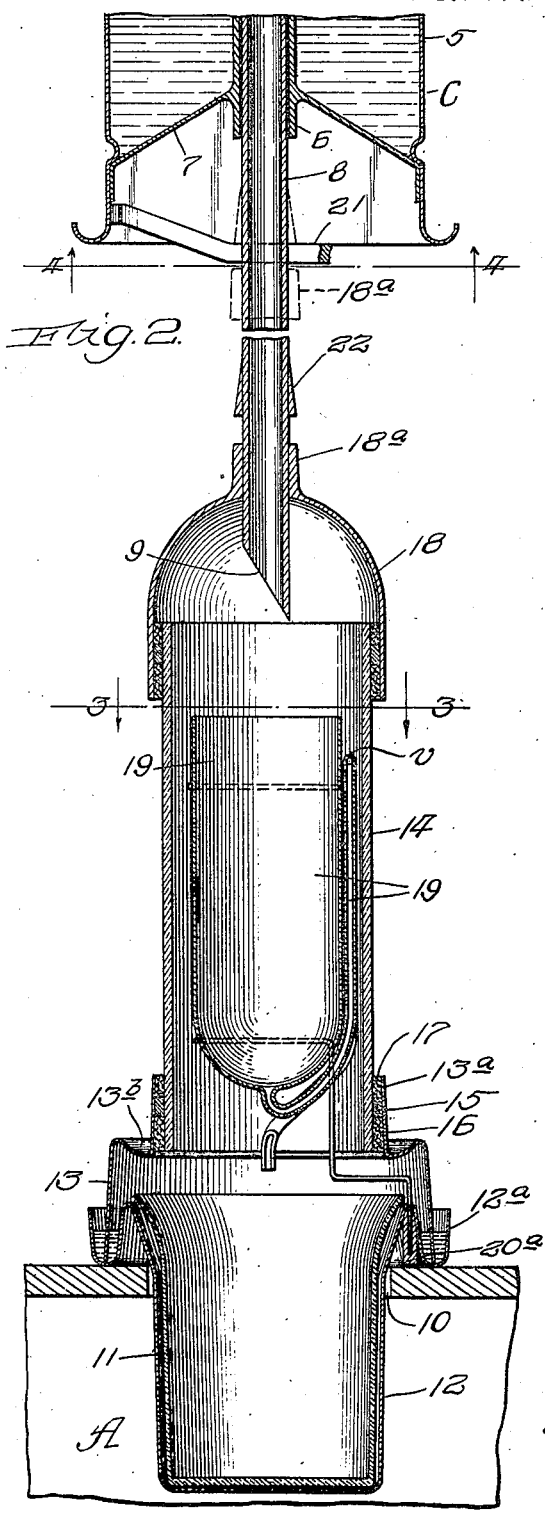
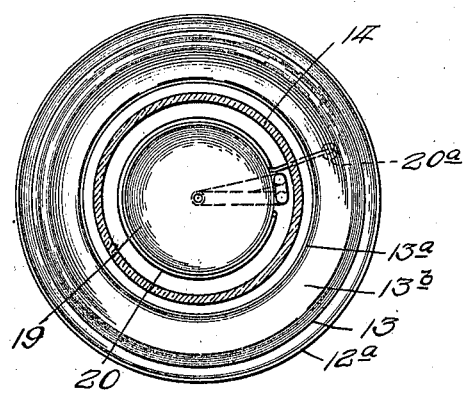
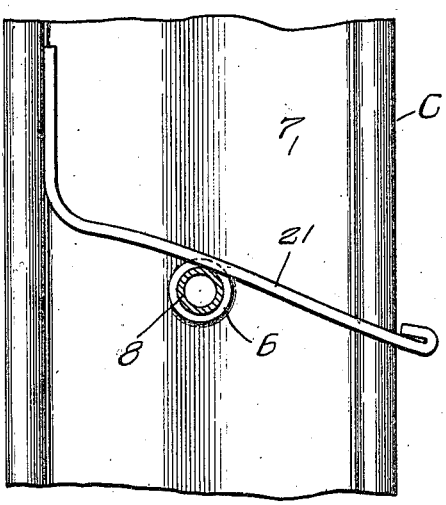
Inventor:
Henry J. Cary-Curr Patented Sept. 25, 1923.

1,468,961

UNITED STATES PATENT OFFICE.

HENRY J. CARY-CURR, OF CHICAGO, ILLINOIS, ASSIGNOR TO E. H. SARGENT & COMPANY, OF CHICAGO, ILLINOIS, A CORPORATION OF ILLINOIS.

EXTRACTION APPARATUS.

Application filed February 28, 1923. Serial No. 621,794.

*To all whom it may concern:*

Be it known that I, HENRY J. CARY-CURR, a citizen of the United States, residing at Chicago, in the county of Cook and State of Illinois, have invented new and useful Improvements in Extraction Apparatus, of which the following is a specification.

My invention relates to an improvement in apparatus, designed more particularly for laboratory use, for employing vaporizable solvents to dissolve and extract soluble substances from materials containing them or with which they are associated; and my improvement is illustrated in the accompanying drawings, in which—

Figure 2 is an enlarged broken view in section taken on the line 2—2, Fig. 1;

Figure 3 is an enlarged section on line 3—3, Fig. 2, and

Figure 4 is a similar section on line 4—4, Fig. 2, showing a bottom plan view of the condenser-tank.

Figure 1:
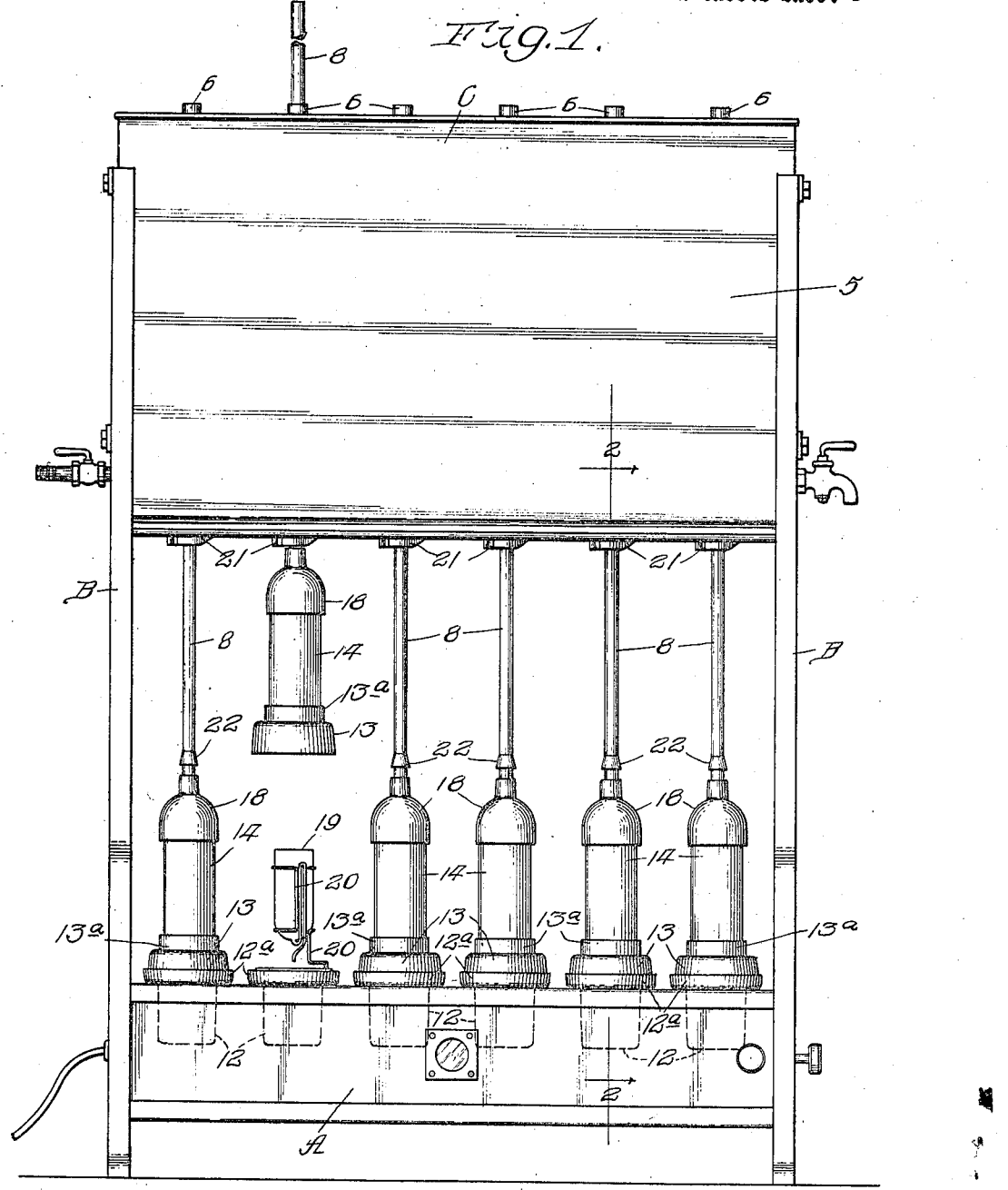
Figure 1 is a view showing the improved apparatus in front elevation.

The apparatus comprises, generally stated, a base consisting of a heater of any suitable kind, an elevated condenser, preferably of the water-cooled type, and intermediate parts for holding the matter to be acted upon by the solvent vaporized by the heater, conducting the solvent to the condenser and returning the condensate to the holder to attack the soluble part of the material therein, whence the liquid solution enters a beaker, supported in position on the heater to receive it, and which contains the supply of the solvent used.

The heater A I prefer to employ is that of my Patent No. 1,083,592, dated January 6, 1914, for an electrical drying oven, but modified by omitting the vent-pipes in the openings 10 in the top thereof and enlarging the openings to afford seats for the cups hereinafter described. The heater is shown to be supported in the lower part of a frame B carrying in its upper part a condenser C, which, like that shown and described in my Patent No. 1,082,304, dated December 23, 1913, for an extraction apparatus, comprises a tank 5, but shown of oblong rectangular shape in the present instance, for the condensing water and having a longitudinal series of guide-sleeves 6 supported to extend through the apex of its bottom 7 (Fig. 2) of inverted general V-shape in cross-section; and condenser-tubes 8, reciprocably confined in the sleeves and having beveled lower drip-ends 9.

In a hole 10 in the top of the heater A and in vertical alinement with a tube 8, or in each hole therein where a series of the holes is provided, as is preferred, a cup 12 is introduced. The cup shown is of beaker-shape and may itself be the beaker for my purpose, though I prefer to employ it for holding or nesting a glass beaker 11, and to form it of iron with an enameled surface to render it rust-proof. The cup is provided with a trough $12^a$ about its mouth to contain mercury, into which dips the flange of a hood 13, also preferably of enameled iron and having a tubular neck $13^a$, between which and the flange a depressed shoulder $13^b$, convex on its under side, is formed to serve the purpose hereinafter explained. A tube 14, preferably of glass to render it transparent, or a "window," is secured at its lower end in the hood-neck $13^a$ by a centering suitable gasket 15 between bands 16 and 17 of ether-tight cement, the upper end of the tube being similarly centered and confined in a dome 18, which I prefer to form of copper and through the neck $18^a$ of which the drip-end of the condenser-tube 8 extends.

To operate the apparatus, a vial or "extraction-cup" 19 for holding a sample to be acted upon, is supported to extend within the tube 14. A wire support 20, of ordinary construction, is shown for this purpose, being pivoted at $20^a$ and looped near its ends to yieldingly encircle the cup 19 and hold it in position, wherein it is spaced from the surrounding wall of the tube 14. The extraction-cup may be of any desired kind, but that shown is of the known siphoning variety, being provided with a siphon-pipe $19^a$ extending from its bottom upwardly along the exterior of the cup and downwardly, by a return-bend at $v$, to terminate below its starting-point at the cup-bottom to discharge centrally within the hood 13. With the parts in position, as represented in Fig. 2, and a sample (not shown) to be subjected to extraction in the cup 19, and with a suitable solvent in the beaker 11 undergoing vaporization by the heater A, the vapors pass through the tube 14 and condenser-tube 8 into the condenser, where they are liquefied, and the liquid returns by gravity through the tube 8, whence it drips into the flask 19 for its dissolving action on the sample therein. As the solution fills the extraction-cup, it overflows, or, with the particular flask shown, siphons into the beaker 11.

The purpose of the depressed shoulder 13[b] on the hood 13 is to prevent solvent, which may seep past the lower end of the tube 14, from entering the mercury-trough 12[a], the mercury in which seals the junction between the hood and cup 12. The shoulder being upwardly inclined in the outward direction, the seepage will not follow it, but will be deflected to drip downwardly directly into the beaker.

For freeing the beaker preparatory to withdrawing it, a spring 21, extending from a wall of the condenser-tank base to bear normally against the condenser-tube 8, is pressed to one side to free the latter. To release the beaker preparatory to withdrawing it, the hood 13 is raised, carrying with it the dome-covered tube 14 and the condenser-tube 8 through its guide-sleeve, whereby a cam-like stop 22 on the condenser-tube is raised past the spring 21, upon which, when returned to its normal position, the shoulder bears and supports the parts in the raised position until the spring is pressed aside when required to permit them to drop into operative position. With the parts thus raised, the vial 19 may be swung to one side.

While the apparatus is shown to be designed to employ a series of similar devices each for the extracting purpose, it may be provided with only one or with any desired number thereof.

Among the advantages afforded by my improved apparatus may be stated that it eliminates all expensive and ground-jointed glassware and contains only a small amount of glass, the apparatus being constructed almost entirely of metal; that no corks are used, and the entire passages are permanently ether-tight, and that the matters of placing and removing the beaker are attended with extreme facility.

I realize that considerable variation is possible in the details of construction herein shown and described, and I do not intend by illustrating a single, specific or preferred embodiment of my invention, to be limited thereto except as pointed out in the appended claims, it being my intention to claim all the novelty inherent in my invention as broadly as is permissible by the state of the art.

I claim:

1. In an extraction apparatus of the character described, the combination with a heater provided with a beaker-support, of a beaker, a mercury-trough about the beaker, a hood dipping into said trough, a condenser having communication through a passage with said beaker, and supporting means in said passage for the material to be treated, communicating with the condenser.

2. In an extraction apparatus of the character described, the combination with a heater provided with a beaker-support, of a beaker, a hood seating about said support and provided with a seepage-deflecting shoulder, a tube provided with supporting means for the material to be treated, said tube having one end confined in the hood and extending adjacent to said shoulder, and a condenser communicating with the opposite end of said tube.

3. In an extraction apparatus of the character described, the combination with a heater provided with a beaker-support, of a beaker, a mercury-trough about the beaker, a hood dipping into said trough and provided with a seepage-deflecting shoulder, a tube provided with supporting means for the material to be treated, said tube having one end confined in the hood and extending adjacent to said shoulder, and a condenser communicating with the opposite end of said tube.

4. In an extraction apparatus of the character described, the combination with a heater, of a metal beaker-support seating in the heater and provided with a circumferential mercury-trough, a hood dipping into said trough and provided with a seepage-deflecting shoulder, a tube provided with supporting means for the material to be treated, said tube having one end confined in the hood and extending adjacent to said shoulder, and a condenser communicating with the opposite end of said tube.

5. An extraction apparatus comprising in combination, a heater at the base of the apparatus, a condenser supported in elevated position above the heater and provided with a reciprocally guided depending drip-tube, a beaker-holder in the heater, a hood seating about said holder, and a dome-topped tube rising from said hood and provided with supporting means for a container for the material to be treated, the condenser-tube communicating with said tube through its dome to discharge into said container.

6. An extraction apparatus comprising, in combination with a supporting frame, a heater at the frame-base, a condenser supported on the upper part of the frame and provided with a reciprocably guided depending drip-tube having a supporting stop thereon, a spring on the condenser-tank extending into the path of said stop, a beaker-holder on the heater, a hood seating about said holder, and a dome-topped tube rising from said hood and provided with supporting means for a container for the material to be treated, the condenser-tube communicating with said tube through its dome to discharge into said container.

7. An extractor apparatus comprising, in combination with a supporting frame, a heater at the frame-base provided with a seat in its top, a beaker-holding cup in said seat provided with a circumferential mercury-trough, a hood having a flange dipping into said trough, a neck and an intermediate deflecting shoulder, a tube seated at its lower end in said neck to extend adjacent said shoulder and carrying a dome on its upper end, supporting means in the tube for a container for the material to be treated, a condenser-tank supported on the upper part of the frame, and a condenser-tube depending from said tank and extending through said dome to drip into said container.

HENRY J. CARY-CURR.